United States Patent [19]

Rhoades

[11] Patent Number: 4,798,022

[45] Date of Patent: Jan. 17, 1989

[54] COMBINATION FISHHOOK AND SWIVEL

[76] Inventor: Dean Rhoades, 9041 Olin St., Los Angeles, Calif. 90034

[21] Appl. No.: 211,882

[22] Filed: Jun. 27, 1988

[51] Int. Cl.⁴ ............................................. A01K 91/04
[52] U.S. Cl. .................................................. 43/44.83
[58] Field of Search .................. 43/44.83, 43.16, 44.82

[56] References Cited

U.S. PATENT DOCUMENTS

| | | | |
|---|---|---|---|
| 237,566 | 2/1881 | Marion | 43/44.83 |
| 1,401,086 | 12/1921 | King | 43/44.83 |
| 1,558,295 | 10/1925 | Sawyers | 43/44.83 |
| 3,091,885 | 6/1963 | Ulsh | 43/44.83 |
| 3,754,347 | 8/1973 | McGahee | 43/44.83 |

FOREIGN PATENT DOCUMENTS 184593  8/1922  United Kingdom .............. 43/44.83

*Primary Examiner*—Gene P. Crosby
*Attorney, Agent, or Firm*—Thomas I. Rozsa

[57] ABSTRACT

A combination fishhook and swivel wherein the swivel is attached at the non-pointed end of the elongated stem of the fishhook and is an integral part of the fishhook. Through the combination fishhook and swivel, the fishhook itself can rotate as the fish trashes and revolves in the water while attempting to break free. As a result the fishing line attached to the combination of fishhook and swivel does not become tangled in the swivel or the fishhook.

4 Claims, 1 Drawing Sheet

COMBINATION FISHHOOK AND SWIVEL

BACKGROUND OF THE INVENTION

1. Field of the Invention

The present invention relates to the field of hooks which are attached to the end of a fishing line for the purpose of hooking a fish after it has swallowed bait which was held by the fishhook. The present invention concerns a modification to the conventional fishhook wherein a swivel is combined as part of the hook structure.

2. Description of the Prior Art

A fishhook is a hook, usually barbed, for catching a fish. Fishhooks have been in existence for many years and essentially comprise an elongated stem portion terminating in a eye at one end. The opposite end of the elongated stem is curved in an arc up to 180 degrees and has a pointed end. The pointed end or tip may contain one or more barbs adjacent the end for the purpose of solidly imbedding the hook in a fish after the fish has swallowed bait which was attached onto the fishhook. A fishing line is tied to the eye.

One improvement in the combination of fishhooks and fishing lines was to attach a swivel between the fishing line and the fishhook. One end of the swivel is attached to the fishing line coming from the reel and the opposite end of the swivel is attached to a second piece of fishing line which connected this end of the swivel to the fishhook. A swivel is a fastening so contrived as to allow the thing fastened to turn freely in any direction. The swivel is usually located a short distance form the eye of the fishhook. The intent of the swivel is to enable the line attached to the fishing rod and the fishhook to pivot or turn freely relative to each other. This is beneficial when the captured fish beings to rotate and thrash in the water in an attempt to get free.

While the attachment of the swivel between the fishing line and the fishhook at a short distance from the fishhook provides an advantage over a direct connection of the fishing line to the fishhook, the combination also produces several disadvantages. By locating the swivel at a distance from the fishhook, the portion of fishing line between the fishhook and swivel can easily become tangled as the fish thrashes in the water. As a result, the portion of line can become tangled in the swivel and break, thereby enabling the captured fish to escape. In addition, a very substantial force is imparted to the short portion of line between the swivel and the fishhook, thereby providing a point of weakness at which the line can break under the strain of a powerful fish tugging on the swallowed fishhook.

No prior art apparatus addresses the problems set forth above in alleviating the tangle and breaking of the section of fishing line located between the fishhook and swivel. As a result, what could have been a successful fishing excursion often results in an unsuccessful trip when this portion of lien breaks, enabling the fish to escape. Therefore, a significant need exists for an improvement to eliminate this problem.

SUMMARY OF THE PRESENT INVENTION

The present invention is a combination fishhook and swivel wherein the swivel is attached at the non-pointed end of the elongated stem of the fishhook and is an integral part of the fishhook. Through the combination fishhook and swivel, the fishhook itself can rotate as the fish trashes and revolves in the water while attempting to break free. As a result the fishing line attached to the combination of fishhook and swivel does not become tangled in the swivel and/or the fishhook and the point of weakness in the previous embodiment is eliminated. As a result, the combination fishhook and swivel provides a stronger and more efficient capturing mechanism by which the captured fish can be retained on the hook and reeled in.

It has been discovered, according to the present invention, that if a swivel is made an integral part of the fishhook, the elimination of a section of fishing line between the swivel and fishhook eliminates a point of weakness where the line can break during the heat of battle while the captured fish is attempting to break free of the hook.

It has also been discovered, according to the present invention, that if a swivel is made an integral part of the fishhook, the elimination of a section of fishing line between the swivel and fishhook eliminates the possibility of the fishing line becoming entangled in the swivel and breaking.

It has further been discovered, according to the present invention, that if a swivel is made an integral part of the fishhook, the combination provides an improved fishing hook which enables the fishhook to rotate while the captured fish is thrashing, thereby providing additional flexibility in the fishhook and fishing line and eliminating any possibility of the fishing line becoming entangled in the swivel or the fishhook.

It is therefore an object of the present invention to provide an apparatus whereby a point of weakness found in prior art fishhook and swivel combinations is eliminated.

It is another object of the present invention to provide an apparatus wherein the possibility of a portion of fishing line becoming entangled with a fishhook or a swivel is substantially eliminated.

It is a further object of the present invention to provide an apparatus which combines a fishhook and swivel is a manner to provide added flexibility to the combination so that the combination fishhook and swivel can rotate even after the fishhook has been swallowed by a fish, to thereby provided added flexibility and strength to the fishing apparatus in securing and reeling in the captured fish.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated:

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
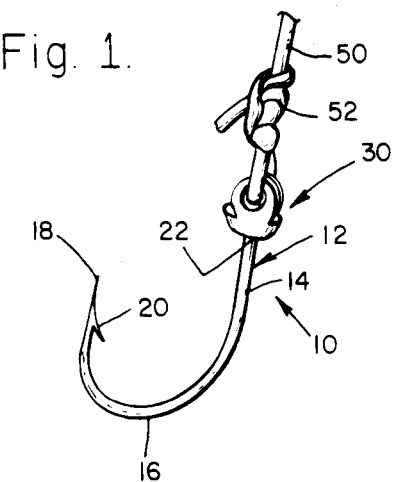
FIG. 1 is a perspective view of the present invention combination fishhook and swivel.

Referring particularly to FIG. 1, there is shown at 10 the present invention combination fishhook and swivel. The fishhook portion 12 comprises an elongated stem portion 14 which is curved into an arcuate portion 16 and terminates in a pointed tip 18. At least one barb 20 is located adjacent pointed tip 18. It will be appreciated that this is only one type of hook portion 12 with which the present invention may be utilized and other conventional hooks can also be incorporated in the combination fishhook and swivel 10. The tip 22 of the elongated stem portion 14 terminates in a swivel 30.

Figure 2:
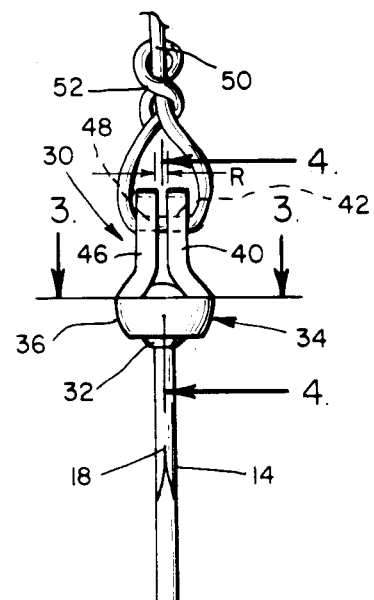
FIG. 2 is a front elevational view of the present invention combination fishhook and swivel.
Figure 3:
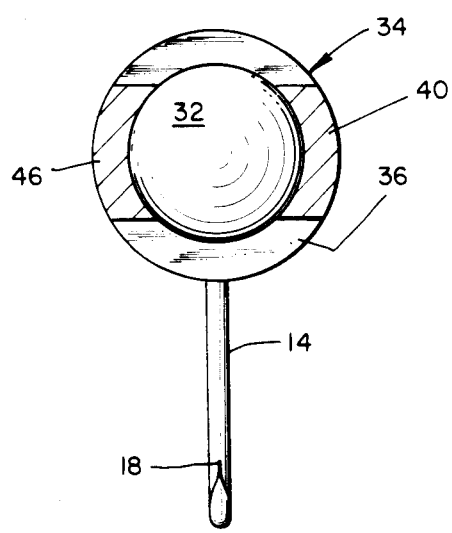
FIG. 3 is a cross-sectional view taken along line 3—3 of FIG. 2.
Figure 4:
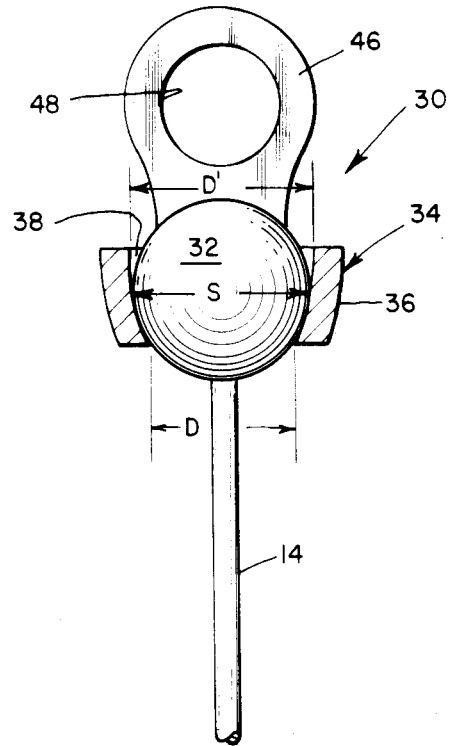
FIG. 4 is a cross-sectional view taken along line 4—4 of FIG. 2.

The portion of the stem 14 and swivel 30 are illustrated in greater detail in FIGS. 2 through 4. The elongated stem portion 14 terminates in a sphere or ball 32 which is nonremovably, movably and rotatably supported within a basket 34. The basket 34 comprises a circular wall 36 with a centrally disposed opening 38 to receive the sphere 32. The wall 36 of the basket 34 is inwardly curved so that its lower diameter D closest to the stem 14 is smaller and its upper diameter D'. The lower diameter D is smaller than the diameter S is the sphere 32 so that the sphere 34 cannot pass through the lower diameter D and therefore cannot be removed from the basket 34 in this direction. At the portion of the basket furthest away from the stem 14, wall 36 further extends upwardly into a pair of arms 40 and 46 which curve inwardly toward each other. In the illustration shown in FIG. 2, the arms are separated by a distance R. It is also within the spirit and scope of the present invention to have the arms 40 and 46 touch each other. The distance R is smaller than the diameter S of the sphere 34 and therefore the sphere cannot be removed from the basket 34 in this direction as well. Arm 40 further comprises an eye 42 and arm 46 further comprises an eye 48. Eyes 42 and 48 are aligned with each other. Therefore, the swivel 30 has been integrated into and is part of the fishhook 12 since the sphere 32 is attached to the stem 14 and must rotate within basket 34 while attached to stem 14. The sphere 32 can rotate freely within the basket 34. The fishing line 50 is threaded through eyes 42 and 48 and is fastened with a knot 52. The opposite end of the fishing line passes through eyes on a conventional fishing rod and is wound on the conventional reel. Therefore, the fishing line is secured directly to the swivel which in turn is an integral part of the fishhook As a result, there is no possibility for the fishing line to become entangled in the fishhook or in the swivel. In addition, the previous point of weakness of having a small section of line between the swivel and fishing hook is eliminated. The present construction not only allows the fishhook and integrated swivel to rotate while both are in the water, but also permits rotation after the fish has swallowed the bait, hook and swivel, to thereby eliminate the possibility of the fish rotating and thrashing and breaking the line.

It will be appreciated that the fishhook as described in only one of many types of common fishhooks which can be utilized with the present invention. While the stem 14 has been shown as extending only into one arcuate portion and barb, it will be appreciated that fishhooks which have a central stem which extends into a multiplicity of arcuate portions and associated pointed ends and barbs are also within the spirit and scope of the present invention. In addition, each point at the end of the arcuate section(s) may have a multiplicity of barbs instead of just one each.

Defined more broadly, the present invention is an apparatus comprising:
(a) a fishhook 12 having an elongated stem 14; and
(b) a swivel 30 attached to the fishhook 12 at the end 22 of the elongated stem 14.

Also, the present invention is an apparatus comprising:
(a) a fishhook 12;
(b) said fishhook 12 further comprising an elongated stem portion 14 having a straight end 22 and which stem portion 14 extends into at least one arcuate portion 16 terminating in a pointed tip 18;
(c) a swivel 30;
(d) said swivel 30 further comprising a sphere 32 nonremovably, movably and rotatably retained within a basket 34 and arm members 40 and 46 extending from the basket 34 and including aligned eyes 42 and 48 therein; and
(e) the sphere 32 of said swivel 30 attached to the straight end 22 of said elongated stem portion 14 of said fishhook 12;
(f) whereby a fishing line 50 can be threaded through said eyes 42 and 48 and thereby attached directly to said swivel 30 and to said fishhook 12.

It will further be appreciated that the type of swivel illustrated is only one of many conventional types of swivels which can be attached so that a portion of the swivel is integrated into the fishhook. Any conventional swivel can be used with the present invention.

The fishhook can be made of any suitable metal material and the swivel can be made of any suitable metal material. The fishhook and swivel may be made of the same metal material or may be fashioned from different metal materials.

The present invention combination fishhook and swivel is not limited in size and can be made and range in size from a small size of a fraction of an inch for small freshwater fish to very large size of several inches for deep sea fishing.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:
1. An apparatus comprising:
a. a fishhook;

b. said fishhook further comprising an elongated stem portion having a straight end and which stem portion extends into at least one arcuate portion terminating in a pointed tip;
c. a swivel;
d. said swivel further comprising a sphere nonremovably, movably and rotatably retained within a basket and arm members extending from the basket and including aligned eyes therein; and
e. the sphere of said swivel attached to the straight end of said elongated stem portion of said fishhook;
f. whereby a fishing line can be threaded through said eyes and thereby attached directly to said swivel and to said fishhook.

2. An apparatus in accordance with claim 1 wherein at least one barb is located adjacent each said at least one pointed tip.

3. An apparatus in accordance with claim 1 wherein said fishhook is made of metal.

4. An apparatus in accordance with claim 1 wherein said swivel is made of metal.

* * * * *